United States Patent Office

Re. 28,024
Reissued May 28, 1974

28,024

PROCESS FOR THE STERILIZATION OF SOLID SURFACES

Alexander Knetemann, deceased, late of Voorburg, Netherlands, by Marie Knetemann, nee Groeneveld, Voorburg, Hubertus Leonardus Maria Lelieveld, Vlaardingen, Renee van Rhee, Maassluis, and Gerald Tuvnenburg Muys, Rotterdam, Netherlands, assignors to Lever Brothers Company, New York, N.Y.

No Drawing. Original No. 3,576,594, dated Apr. 27, 1971, Ser. No. 747,078, July 24, 1968. Application for reissue Apr. 23, 1973, Ser. No. 353,917
Claims priority, application Great Britain, July 31, 1967, 35,123/67
Int. Cl. A61l *13/00*
U.S. Cl. 21—57 5 Claims

Matter enclosed in heavy brackets [ ] appears in the original patent but forms no part of this reissue specification; matter printed in italics indicates the additions made by reissue.

ABSTRACT OF THE DISCLOSURE

The sterilisation of solid surfaces, such as the interior of food containers, is achieved by hydrogen chloride gas at temperatures below 40° C. in a manner such that there is no residual hydrochloric acid on the sterilised surface, control of the interrelated factors of temperature, duration of contact, and water-vapor, hydrogen chloride content being employed.

This invention is concerned with a method of sterilizing solid surfaces, more praticularly surfaces of containers for food products, pharmaceuticals, and the like, such as cans, plastic containers, glass and ceramic jars, by means of gaseous hydrogen chloride.

By sterilization we mean that substantially all living spores of aerobic and anaerobic bacteria and vegetative cells of micro-organisms are killed.

In accordance with the invention it has been found that solid surfaces can be sterilized in a very simple and effective manner by contacting these surfaces at ambient temperature for a certain time with an atmosphere containing an amount of gaseous hydrogen chloride and preferably also containing an amount of water vapour, under such conditions that after the sterilization is achieved the surface will be substantially free of hydrochloric acid. By this we mean that in case some hydrochloric acid is present on the surface, the amount thereof is such that it will have no detrimental effect on the material from which the surface is prepared and, as the case may be, on the quality of the product subsequently placed in the container, so that no subsequent washing of the surfaces is required.

The origin of the gaseous hydrogen chloride present in the atmosphere is not an essential factor. It may be either introduced as such, for example from a cylinder, or a product may be used which spontaneously or under the influence of moisture will give off hydrogen chloride. Examples of such products are aluminum chloride, phosphorus pentachloride, phosphorus oxychloride and the like. However, in a very simple and preferred embodiment of the invention aqueous solution of hydrogen chloride is evaporated to give an atmosphere of a suitable composition.

It has been found that the efficacy of the process is dependent on the following factors: (a) temperature; (b) composition of the atmosphere regarding its content of hydrogen chloride and water vapour and (c) duration of the contact. As these factors are interdependent, it is impossible to provide absolute values for the parameters involved. However, for practical purposes, viz. to make the process suitable for industrial use, it is of advantage to restrict the values of the indicated parameters to certain preferred limits as indicated below, whereby it is stated explicitly that these limits cannot be combined ad libitum and that they are not to be construed as limiting the invention in any manner.

Regarding the temperature it can be said that at higher temperature a lower concentration of gaseous hydrogen chloride and/or a shorter contact time can be used. As indicated above the process is carried out at ambient temperature, which means a temperature of between —5° and 40° C., usually of between 0° and 30° C., in particular of between 15° and 25° C.

When using aqueous hydrochloric acid as source of the hydrogen chloride and of the water vapour, the composition of the atmosphere is preferably such that the gaseous hydrogen chloride will exert a partial pressure ($p_{HCl}$) of between 0.05 and 50 mm., preferably between 0.5 and 20 mm., whereas the partial pressure of the water vapour ($p_{H2O}$) will be between 1 and 20 mm., preferably between 5 and 15 mm. These conditions can be realized by evaporating an adequate amount of aqueous hydrochloric acid of a concentration of 10 to 37% by weight, preferably of a concentration of 18 to 30% by weight.

In case the temperature of the surface to be sterilized might be lower than that of its environment, care should be taken that the composition of the atmosphere is such that the temperature of the surface is higher than the dew point of the water vapour present in the atmosphere, as otherwise an aqueous condensate, containing hydrochloric acid, will be formed on the surface.

Finally the values of the above discussed parameters are chosen in such a manner that an effective sterilization is achieved within 24 hours, preferably within 60 minutes.

The above indicated values are suitable for smooth surfaces. However, since it is important that the hydrogen chloride should have free access to all parts of the surface, it is clear that the sterilization of folded surfaces, such as seams of cans, will require a longer contact and/or higher concentration of hydrogen chloride than the sterilization of smooth surfaces.

Furthermore, it will be understood that before exposing the surfaces to the sterilization process they will have to be cleaned and dried by conventional methods in order to remove coarse impurities. Even then the surfaces may still be contaminated by compounds which will interfere with the sterilization process. Examples of such compounds are calcium carbonate, fatty acids, and salts thereof, oils, grease and proteins, such as milk proteins, here again depending on the amount and the types of the adhering impurity; and effective sterilization will need a more prolonged treatment and/or a higher concentration tion of hydrochloric acid yielding hydrogen chloride, which conditions can be assessed experimentally.

The process according to the invention is particularly useful for the sterilization of inner surfaces of containers for foodstuffs, such as cans, plastic containers, glass or ceramic jars etc. in which case the process is conveniently applied as part of the packaging process. Furthermore the process can be employed for the sterilization of the inner surfaces of other containers, for example to be used for the packing of bacteriological medial and bacteriological cultures, for the sterilization of plastic or paper sheets, to be used for the wrapping of material susceptible to microbiological contamination and for the sterilization of surgical instruments. Finally the process can be used for the sterilization of surfaces of finely-divided materials, such as crystals of kitchen salts, etc., to be used as ingredients of pre-sterilized foodstuffs. In the latter case measures have to be taken to ensure that the whole of the surface of the particles will be exposed to the hydrogen chloride-containing atmosphere. Here again the proper conditions for achieving an effective sterilization can be assessed by simple experiments.

The process is illustrated by the following examples:

EXAMPLE 1

Spore suspensions were prepared by mixing 10 g. hyflo, containing $10^5$ spores (Clostridium and Bacillus species) per g. with 70 ml. water.

2 ml. of such a suspension were spread evenly over the inner surface of glass bottles of a volume of 300 ml. After removing excess of the spore suspension by inverting the bottles for a short time, they were dried for 21 hours at 60 to 70° C. Then 0.25 ml. aqueous hydrochloric acid was introduced into each bottle, whereafter these bottles were sealed by means of a plastic foil. The thus treated bottles were kept for a predetermined period at a predetermined temperature. After opening the bottles were washed with 10 ml. of a sterile aqueous solution of a stoichiometric quantity of sodium hydroxide. A sufficient amount of agar was dissolved in this washing liquor and the solution incubated for 2 to 3 days at 30° C. whereafter the number of surviving spores was determined by conventional methods. The results are given in Tables 1 and 2.

TABLE 1

| | Temperature, ° C. | | | | | | | |
|---|---|---|---|---|---|---|---|---|
| | 0 | | 5 | | 20 | | | |
| Conc. HCl in percent | 18 | 24 | 31 | 37 | 18 | 24 | 31 | 37 |
| $p_{HCl}$ in mm. Hg | 0.014 | 0.18 | 4.2 | 20.4 | 0.10 | 1.0 | 9.6 | 32 |
| $p_{H_2O}$ in mm. Hg | 2.86 | 2.04 | 1.82 | 1.24 | 11.2 | 8.28 | 5.55 | 4.25 |
| | Survival [1] (Bacillus sp.) | | | | | | | |
| Contact time in mins.: | | | | | | | | |
| 5 | $15\times10^3$ | $10.5\times10^3$ | 50 | $1.0\times10^2$ | $14\times10^3$ | 60 | <10 | <10 |
| 10 | $23.5\times10^3$ | $4.2\times10^3$ | 30 | <10 | $1.1\times10^3$ | <10 | <10 | <10 |
| 20 | $13.5\times10^3$ | $4.2\times10^3$ | <10 | <10 | 50 | <10 | <10 | <10 |
| 40 | $4\times10^3$ | <100 | <10 | <10 | <10 | <10 | <10 | <10 |
| 60 | $1.3\times10^3$ | 20 | <10 | <10 | <10 | <10 | <10 | <10 |
| Control | | $10.3\times10^3$ | | $23.6\times10^2$ | | | $2.5\times10^4$ | |

[1] Mean of 3 runs.

TABLE 2

[Contact time: 30 minutes]

| | Conc. HCl in percent | $p_{HCl}$ | $p_{H_2O}$ | Surviving | |
|---|---|---|---|---|---|
| | | | | Bac. sp. | Clostr. sp. |
| Temp. ° C.: | | | | | |
| 0 | 26 | 0.41 | 1.78 | 60 | 40 |
| | 28 | 0.45 | 1.52 | 20 | 20 |
| | 30 | 2.12 | 1.30 | <10 | <10 |
| | 32 | 4.4 | 1.10 | <10 | <10 |
| 15 | 22 | 0.31 | 6.68 | <10 | <10 |
| | 24 | 0.66 | 6.01 | <10 | <10 |
| | 26 | 1.40 | 5.31 | <10 | <10 |
| 20 | 18 | 0.102 | 11.2 | 80 | <10 |
| | 20 | 0.228 | 10.2 | <10 | <10 |
| | 22 | 0.475 | 9.25 | <10 | <10 |
| | 24 | 1.02 | 8.28 | <10 | <10 |
| 30 | 18 | 0.26 | ±20.6 | <10 | <10 |
| | 20 | 0.54 | 18.7 | <10 | <10 |
| | 22 | 1.08 | 17 | <10 | <10 |
| Control | | | | $8.5\times10^3$ | $8.2\times19^3$ |

EXAMPLE 2

Suspensions were prepared containing $10^5$/ml. of the following microorganisms: Penicillium glaucum (P.g.), Monascus ruber (M.r.), Cladosporium suaveolens (C.s.), Mycobacterium phlei (Myc. p.) and Mycobacterium rubrum (Myc. r.).

Glass bottles of a volume of 180 ml., were infected with equal amounts of the suspension and dried overnight. After introducing 1 drop of 30% hydrochloric acid into each of the bottles, the latter were closed and kept for different periods at a temperature of 20° C.

The number of surviving moulds and Mycobacterium species was determined by standard methods. The results are given in Table 3.

TABLE 3

| | Control | | | | | After sterilization with HCl | | | | |
|---|---|---|---|---|---|---|---|---|---|---|
| Contact time, in hr. | P. g. | M. r. | C. s. | Myc. r. | Myc. p. | P. g. | M. r. | C. s. | Myc. r. | Myc. p |
| 0.1 | 120 | 20 | 110 | $10^3$ | $10^4$ | 40 | 10 | 70 | $9\times10^3$ | $10^3$ |
| 1 | 40 | 40 | 100 | $1.2\times10^3$ | $1.1\times10^4$ | 0 | 0 | 0 | 19 | 0 |
| 2 | 80 | 26 | 150 | $1.1\times103$ | $1.0\times10^4$ | 0 | 0 | 0 | 0 | 0 |
| 3 | 140 | 33 | 220 | $1.0\times10^3$ | $1.1\times10^4$ | 0 | 0 | 0 | 0 | 0 |
| 4 | 50 | 23 | 250 | $10^3$ | $1.1\times10^4$ | 0 | 0 | 0 | 0 | 0 |
| 5 | 70 | 19 | 220 | $1.2\times10^3$ | $1.2\times10^4$ | 0 | 0 | 0 | 0 | 0 |

EXAMPLE 3

Groups of 10 internally lacquered cans (58 × 144.5 mm.) were placed in a plastic box of 25 l., together with a wide-mouthed glass bottle containing 25 ml. 30% aqueous hydrochloric acid. After a specified exposure time at 20° C. the cans were filled aseptially with sterile meat extract and sealed by means of a presterilized seaming machine. After an incubation time of 5 days the cans were opened and examined for the presence of non-spore-forming and sporeforming bacteria.

The following results were obtained:

Exposure time 60 minutes: 5 out of 10 cans not sterile
Exposure time 120 minutes: 1 one out 10 cans not sterile
Exposure time 180 minutes; all cans sterile.

What is claimed is:

1. In a process for aseptically packaging a material in containers, the improvement comprising the steps of:
   (i) introducing into a container an atmosphere comprising gaseous hydrogen chloride [having a partial pressure of from about 0.05 to 50 mm. Hg] and water vapour [having a partial pressure of from about 1 to 20 mm. Hg] the inner surface of the container being contacted with said atmosphere being maintained at a temperature of from about −5° C. to 40° C., said temperature being higher than the dew point of the water vapour present in said atmosphere,
   (ii) holding said atmosphere in contact with said inner container surface for a period of time sufficient to sterile said surface, and
   (iii) subsequently introducing into said sterilised container said material to be packaged.

2. The process according to claim 1, wherein the temperature is between 0° and 30° C.

3. The process according to claim 1, wherein the temperature is between 15° and 25° C.

4. The process according to claim 1, wherein the partial pressure of the hydrogen chloride present in the atmosphere is between 0.5 and [20] *50* mm. Hg and the partial pressure of the water vapour in the atmosphere is between [5] *1* and [15] *20* mm. Hg.

*5. The process according to claim 1, wherein the partial pressure of the hydrogen chloride present in the atmosphere is between 0.5 and 20 mm. Hg and the partial pressure of the water vapour in the atmosphere is between 5 and 15 mm. Hg.*

References Cited

The following references, cited by the Examiner, are of record in the patented file of this patent or the original patent.

UNITED STATES PATENTS

| | | | |
|---|---|---|---|
| 251,925 | 1/1882 | Nietscke | 21—58 |
| 630,782 | 8/1899 | Schmidt | 21—58 |

| | | | |
|---|---|---|---|
| 2,112,159 | 3/1938 | Jackson | 424—127 X |
| 2,129,275 | 9/1938 | Hartzell et al. | 21—58 |
| 3,139,323 | 6/1964 | Shields et al. | 21—57 |

FOREIGN PATENTS

| | | | |
|---|---|---|---|
| 623,733 | 5/1949 | Great Britain | 21—58 |

OTHER REFERENCES

Grant, J.: Hackh's Chemical Dictionary; McGraw-Hill; 3rd edition; New York, 1944 (p. 419 relied on).

BARRY S. RICHMAN, Primary Examiner

U.S. Cl. X.R.

21—58; 99—182.